Patented Apr. 20, 1937

2,077,893

UNITED STATES PATENT OFFICE 2,077,893

VAT DYESTUFFS OF THE DIBENZ-ANTHRONE SERIES

Heinrich Neresheimer, Anton Vilsmeier, and Robert Held, Ludwigshafen-on-the-Rhine, Germany, assignors to General Aniline Works, Inc., New York, N. Y., a corporation of Delaware No Drawing. Application July 16, 1936, Serial No. 90,898. In Germany July 24, 1935

7 Claims. (Cl. 260—61)

The present invention relates to vat dyestuffs of the dibenzanthrone series.

We have found that new vat dyestuffs of the dibenzanthrone series are obtained by acting on Bz-trihydroxy- or Bz-tetra-hydroxy-dibenzanthrones with alkylating or aralkylating agents.

Suitable initial materials for the process according to this invention can be obtained for example by treating Bz-amino-Bz2.Bz2'-dihydroxydibenzanthrones or the corresponding Bz2.Bz2'-quinones with hydrolizing agents or by heating dibenzanthrone-Bz2.Bz2'-quinones having no amino groups in the Bz3-positions and at least one unsubstituted Bz3-position with sulphuric acid.

Suitable alkylating or aralkylating agents are for example monohalogen or polyhalogen alkyls or aralkyls, alkyl or aralkyl esters of sulphuric acid or of sulphonic acids such as para-toluene sulphonic acids, and aldehydes, as for example formaldehyde. The alkylation or aralkylation of the polyhydroxy-dibenzanthrones may also be carried out in stages, mixed ethers of the Bz-trihydroxy- or Bz-tetrahydroxy-dibenzanthrones thus being obtained if desired.

The reaction is preferably carried out in organic liquids of high boiling point while heating in the presence of agents binding acids, but in many cases, as for example when employing formaldehyde as the alkylating agent, the reaction may also be carried out at room temperature and in inorganic agents, such as concentrated sulphuric acid or chlorsulphonic acid.

The vat dyestuffs obtainable according to this invention usually yield on vegetable fibres bluegreen to violet dyeings which are generally speaking distinguished by very good properties as regards fastness.

The following examples will further illustrate how the said invention may be carried out in practice but the invention is not restricted to these examples. The parts are by weight.

Example 1

A suspension of 10 parts of Bz2.Bz2'.Bz3-trihydroxy-dibenzanthrone (obtainable by heating dibenzanthrone-Bz2.Bz2'-quinone with sulphuric acid of about 90 per cent strength in about 100 parts of boiling trichlorbenzene is stirred in the presence of potassium carbonate and an excess of para-toluene sulphonic acid methyl ester until a sample filtered off and dissolved in pyridine no longer changes its green-blue shade of color upon the addition of acetic anhydride while hot, i. e. until any compound having a free hydroxyl group is no longer detectable in the mixture. The whole is then allowed to cool somewhat, undissolved constituents are filtered off by suction and washed with hot trichlorbenzene and the Bz2.Bz2'.Bz3-trimethoxydibenzanthrone is obtained from the deep blue filtrate in the form of lancet-shaped crystals by concentrating the solution. The compound dissolves in concentrated sulphuric acid giving a red-violet coloration and in pyridine giving a green-blue coloration. It dyes cotton bluegreen shades of excellent fastness from a blue vat.

The dyestuff may also be obtained by freeing the reaction mixture from trichlorbenzene by means of steam.

If the ethyl ester of para-toluenesulphonic acid be used instead of the methyl ester, a dyestuff is obtained which dissolves even more readily in organic solvents and which dyes cotton vivid greenish blue shades from a blue vat.

The dyestuffs obtainable by using para-toluenesulphonic acid methoxyglycol or normal-butoxyglycol esters yield somewhat more bluish dyeings. By reason of the fact that they also dissolve very well in most organic liquids of low boiling point, they may be advantageously employed also for coloring lacquers and the like.

Example 2

An anhydrous mixture of 10 parts of Bz2.Bz2'.Bz3-trihydroxydibenzanthrone, 20 parts of potassium carbonate, 40 parts of para-toluenesulphonic acid chlorethyl ester and 120 parts of trichlorbenzene is boiled under reflux until a compound containing a free hydroxyl group can no longer be detected in a sample withdrawn. The mixture is then allowed to cool to 120° C. and undissolved constituents are filtered off by suction and washed with trichlorbenzene warmed at a temperature of 120° C. By cooling the filtrate, a dark blue precipitate is obtained which dissolves in concentrated sulphuric acid giving a red-violet coloration, in pyridine with a blue coloration with a red fluorescence and which dyes cotton reddish blue shades from a blue vat.

A more readily soluble constituent remains in the trichlorbenzene and may be recovered in the usual manner. It may be obtained for example from chloroform, in which it dissolves with a greenish blue coloration, in the form of flat needles which appear blue-green under the microscope. It dyes cotton greenish blue shades from a blue vat.

By employing a larger excess of para-toluene-sulphonic acid chlorethyl ester, the formation of the reddish blue dyestuff may be suppressed to a considerable extent in favor of that of the compound giving greenish dyeings.

*Example 3*

The methylation of Bz2.Bz2'.Bz3-trihydroxydibenzanthrone is carried out in the manner described in Example 1 but while replacing the potassium carbonate by secondary sodium phosphate. A dyestuff is obtained which dissolves readily in most organic solvents; its greenish blue solution in pyridine changes upon the addition of acetic anhydride to blue-violet with a brown-red fluorescence which indicates the presence of free hydroxyl groups.

The greenish blue dyeing of the new dyestuff is accordingly less fast to chlorine than that of the trimethyl ether. By introducing further alkyl groups, this drawback can be avoided; by methylating the dyestuff in the presence for example of potassium carbonate, trimethoxydibenzanthrone is obtained and by introducing other alkyl groups, mixed alkylated dyestuffs are obtained.

*Example 4*

A mixture of 10 parts of Bz2,Bz2',Bz3-trihydroxydibenzanthrone and 80 parts of benzotrichloride is boiled for several hours until the blue-violet color of the solution no longer changes by further boiling. After cooling, the resulting violet-black dyestuff is filtered off by suction, washed with ethanol and dried. It contains chlorine, dissolves in concentrated sulphuric acid giving a brown-violet coloration and in pyridine giving a blue coloration with a pale brown-red fluorescence which increases considerably on the addition of acetic anhydride and boiling the solution. It dyes cotton greenish blue shades from a reddish blue vat.

*Example 5*

1 part of paraformaldehyde is introduced into a solution of 10 parts of Bz2,Bz2',Bz3-trihydroxydibenzanthrone in 200 parts of 96 per cent sulphuric acid while stirring at room temperature and the mixture is further stirred until the reaction is completed. The solution is then poured into water and the precipitate filtered off and washed with water. The dyestuff thus obtained in the form of a violet paste forms after drying a violet-black powder which dissolves in concentrated sulphuric acid giving a red-violet coloration and in boiling trichlorbenzene giving a carmine-red coloration with a scarlet-red fluorescence. Its reddish blue solution in pyridine becomes red-violet with a scarlet-red fluorescence upon the addition of acetic anhydride.

If the dyestuff be treated with a methylating agent in the manner described in Example 1 it is converted into a dyestuff which dyes cotton vivid violet shades fast to chlorine. There is also formed a constituent considerably more readily soluble in trichlorbenzene which yields on cotton reddish blue dyeings which are also fast to chlorine.

A dyestuff very similar to that described in the first paragraph is obtained by boiling trihydroxydibenzanthrone in the presence of trichlorbenzene with an excess of formaldehyde. It may be separated from unchanged initial material if necessary by reason of its greater solubility in boiling trichlorbenzene.

*Example 6*

30 parts of Bz2,Bz2',Bz3,Bz3'-tetrahydroxydibenzanthrone (obtainable by nitrating dibenzanthrone Bz2.Bz2'-quinone, reducing the dinitro compound formed to the corresponding Bz3.Bz3'-diamino-Bz2,Bz2'-dihydroxydibenzanthrone, converting it into Bz3.Bz3'-diaminodibenzanthrone-Bz2.Bz2'-quinone with ferric sulphate and acting thereon with 80 per cent sulphuric acid and reducing the Bz3,Bz3'-dihydroxydibenzanthrone-Bz2,Bz2'-quinone with sodium bisulphite) are methylated with paratoluenesulphonic acid methyl ester in the manner described in Example 1. The dyestuff is separated in the manner described in Example 1. If desired, for the purpose of further purification, it may be crystallized from boiling ortho-dichlorbenzene whereby it is obtained in well-formed crystals. According to analysis and properties it is Bz2,Bz2',Bz3,Bz3'-tetramethoxydibenzanthrone. It dissolves in concentrated sulphuric acid giving a reddish-violet coloration and in pyridine giving a red-blue coloration. With alkaline hydrosulphite solution it forms a blue vat from which cotton is dyed very fast greenish blue shades.

A dyestuff having similar properties is obtained by starting from the dibromo-Bz2,Bz2',Bz3,Bz3'-tetrahydroxydibenzanthrone obtainable by converting the dibromo compound described in Example 1 of the U. S. Patent No. 1,505,912 into the dibromo-Bz2,Bz2',Bz3,Bz3'-tetrahydroxydibenzanthrone in the manner described in lines 2 to 8 of paragraph 1.

*Example 7*

A mixture of 10 parts of Bz2,Bz2',Bz3,Bz3'-tetrahydroxydibenzanthrone (see Example 6), 250 parts of trichlorbenzene, 30 parts of anhydrous sodium carbonate and 30 parts of paratoluolsulphonic acid chlorethyl ester is heated to boiling until any compound having a free hydroxyl group is no longer detectable in the mixture. It is then allowed to cool to 120° C. and the residue is filtered off by suction and washed with warm trichlorbenzene. The dyestuff is then freed from trichlorbenzene and inorganic salts, for example by treatment with steam and hot water. It is a dark powder which dissolves in concentrated sulphuric acid giving a blue-violet coloration and in pyridine giving a blue-green coloration. It dyes cotton from a blue vat powerful fast blue-green shades.

By distilling off part of the trichlorbenzene of the said filtrate or by diluting it with ligroin, a dyestuff is obtained which dissolves more readily in trichlorbenzene. It is a dark powder which dissolves in concentrated sulphuric acid giving a blue-violet coloration and in pyridine giving a blue-green coloration. It dyes cotton from a blue vat somewhat more blue and more vivid shades than the dyestuff described in paragraph 1.

*Example 8*

100 parts of the brominated dimethoxydibenzanthrone described in Example 1 of the U. S. Patent 1,505,912 are dissolved in 2000 parts of sulphuric acid monohydrate. After the addition of 10 parts of ammonium vanadate the mixture is stirred for 4 hours. Then 200 parts of glacial acetic acid are added and the mixture is heated at from 195° to 200° C. for half an hour. After cooling it is allowed to stand for about 12 hours, heated at about 50° C. and the precipitate formed is filtered off by suction and washed with 700 parts of a mixture of concentrated sulphuric acid and glacial acetic acid (ratio 10:1). The reaction product is then boiled with a mixture of 5000 parts of water and 50 parts of a 40 per cent sodium bisulphite solution, then filtered off by suction, washed until neutral and dried. The compound thus obtained is a dark green crystalline powder which dissolves in concentrated sulphuric acid giving a red-violet coloration. Upon the addition of water it is precipitated from this solution in the form of blue-green flakes.

A mixture of 15 parts of the dibromo compound thus obtained with 30 parts of para-toluene sulphuric acid methyl ester is slowly introduced into a boiling mixture of 300 parts of trichlorbenzene and 30 parts of anhydrous potassium carbonate. After four hours the liquid is filtered off by suction and the residue is boiled with 200 parts of trichlorbenzene. The filtrates are freed from trichlorbenzene by means of steam and the residue is purified by boiling it with monochlorbenzene. It may be recrystallized from nitrobenzene.

Dibromo - $Bz2, Bz2', Bz3$ - trimethoxydibenzanthrone is thus obtained in the form of a blue-violet crystalline powder which dissolves in pyridine giving a blue-green coloration and in concentrated sulphuric acid giving a red-violet coloration. By diluting this solution with water the dyestuff separates in the form of blue-green flakes. It dyes cotton from a blue vat very fast blue-green shades.

What we claim is:

1. Vat dyestuffs of the dibenzanthrone series selected from the class consisting of dibenzanthrones containing from three to four alkoxy groups in the $Bz2, Bz2'$, $Bz3$ and $Bz3'$-positions and the halogenated derivatives of these compounds.

2. Dibenzanthrones containing from three to four alkoxy groups in the $Bz2, Bz2'$, $Bz3$ and $Bz3'$-positions.

3. A $Bz2,Bz2',Bz3$-trialkoxydibenzanthrone.

4. A $Bz2,Bz2',Bz3,Bz3'$- tetra - alkoxydibenzanthrone.

5. $Bz2,Bz2',Bz3$-trimethoxydibenzanthrone.

6. $Bz2,Bz2',Bz3,Bz3'$- tetra - methoxydibenzanthrone.

7. The dibromo-$Bz2,Bz2',Bz3$-trimethoxydibenzanthrone forming a blue violet crystalline powder which dissolves in concentrated sulphuric acid giving a red-violet coloration and dyes cotton from a blue vat very fast blue-green shades.

HEINRICH NERESHEIMER.
ANTON VILSMEIER.
ROBERT HELD.